S. C. McCANDLESS.
TRACTION APPARATUS FOR FIELD OPERATIONS.
APPLICATION FILED NOV. 22, 1906.
910,217.
Patented Jan. 19, 1909.
2 SHEETS—SHEET 1.
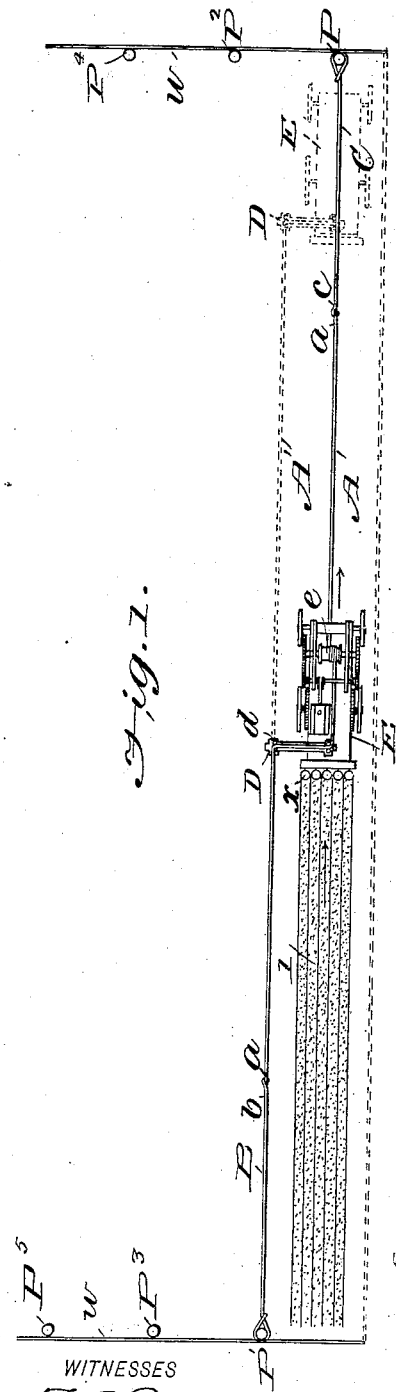
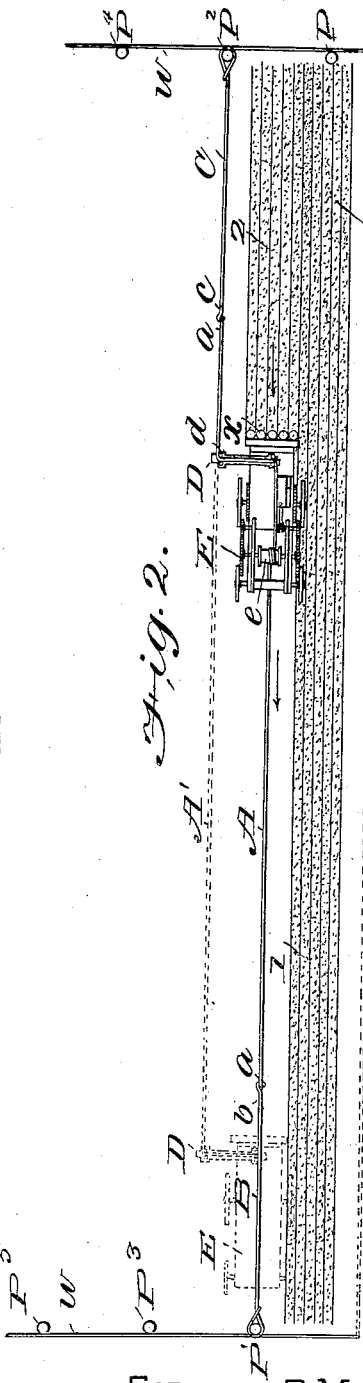
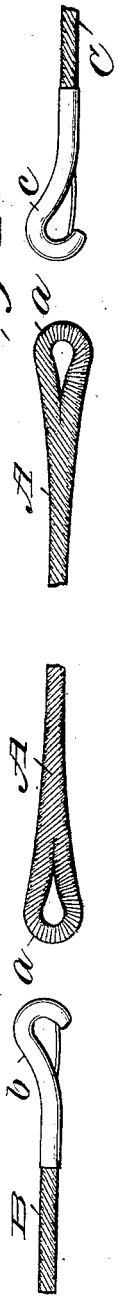
WITNESSES
F.C. Barry
Edw. W. Byrn
INVENTOR
SIDNEY C. McCANDLESS
BY Munn & Co.
ATTORNEYS

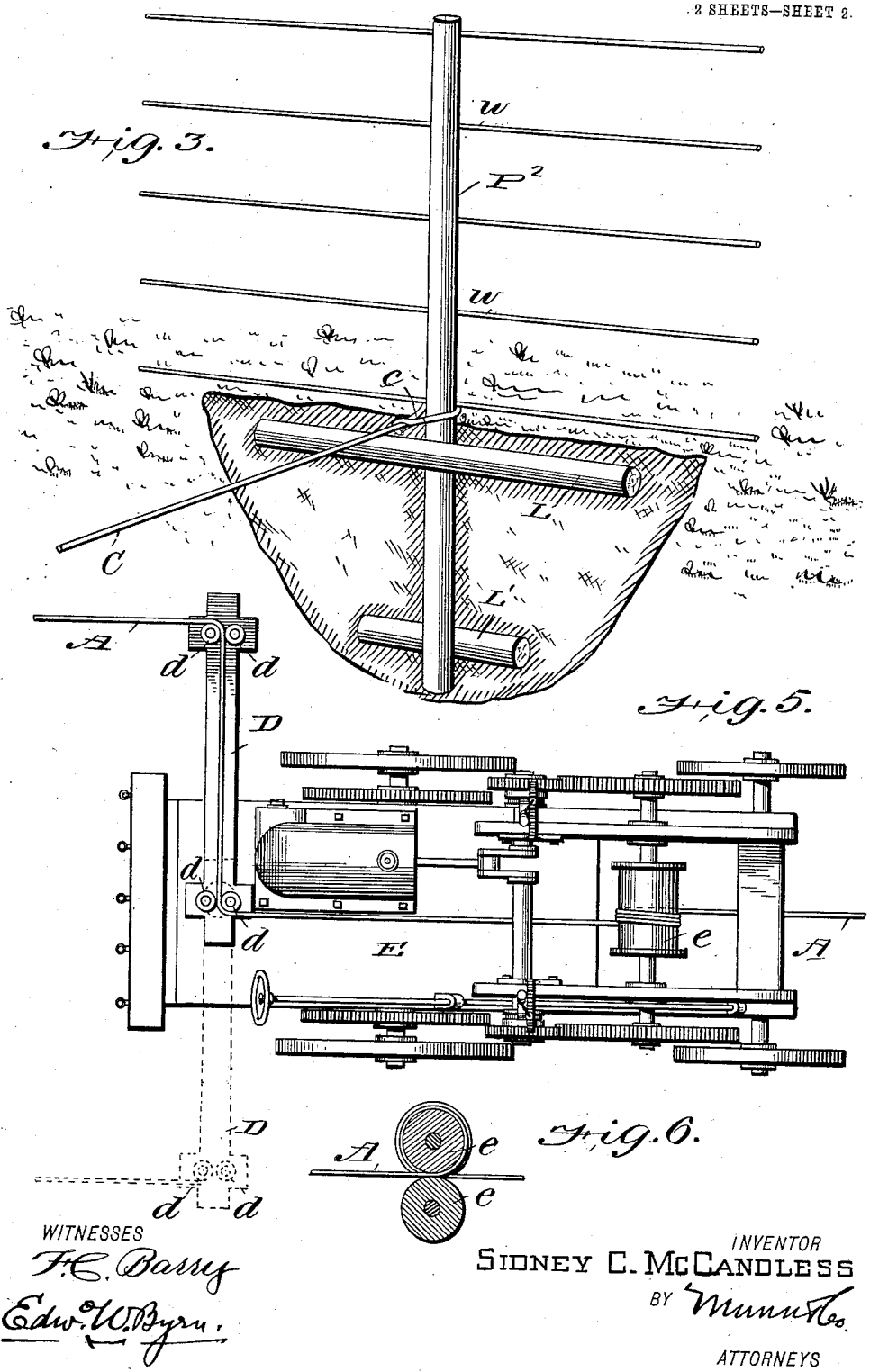

UNITED STATES PATENT OFFICE.

SIDNEY COLEMAN McCANDLESS, OF SAVANNAH, GEORGIA, ASSIGNOR TO CLYDE J. EASTMAN, OF LOS ANGELES, CALIFORNIA.

TRACTION APPARATUS FOR FIELD OPERATIONS.

No. 910,217.     Specification of Letters Patent.     Patented Jan. 19, 1909.

Application filed November 22, 1906. Serial No. 344,597.

*To all whom it may concern:*

Be it known that I, SIDNEY COLEMAN McCANDLESS, a citizen of the United States, residing at Savannah, in the county of Chatham and State of Georgia, have invented a new and useful Improvement in Traction Apparatus for Field Operations, of which the following is a specification.

In the large farming operations of the West the steam traction engine, drawing a gang of plows of from twenty-five to thirty feet in width, has been successfully employed. Such engines, however, rely for their draft upon the tractive adhesion of their running wheels on the ground and to render this effective, in overcoming the resistance of the plows in the ground, the engines are made very heavy and of large power with immensely broad tired traction wheels measuring several feet across the face of the tires.

My invention is designed to reduce the cost, weight, and power of the traction engine, and in reaching this result, I dispense with the tractive adhesion of the wheels on the ground for obtaining the draft, and substitute a direct pull in which the weight and power of the engine is reduced to a minimum.

In carrying out my invention the field is to be first laid off and fenced with posts which latter are so securely planted as to form anchorage points to which a cable or chain is attached and stretched across the field and the engine is constructed and arranged to pull on the cable, taking it up in front and paying it out behind, and in its transit across the field drags the plows or harrows. The cable is shifted to new anchorage posts at each trip across the field and to this end it is made in three sections and the engine is also provided with a reversible laying device which relays the cable for the return trip parallel to and at a fixed distance from the position of the cable on the first trip, as hereinafter described with reference to the drawings, in which—

Figure 1 is a diagrammatic illustration of a field laid off with posts in accordance with my invention and showing the first trip of the engine across the field. Fig. 2 is a similar view, showing the return trip with the new position of the cable. Fig. 3 is a perspective view showing the method of planting the fence posts to enable them to successfully resist the pull of the cable draft strain. Figs. 4 and 4ª are details showing the couplings for the adjustable end sections of the cable. Fig. 5 is a plan view of the traction engine, showing only such portions of the same as necessary to illustrate my invention. Fig. 6 is a sectional detail of the gripping drums.

In the drawing, Figs. 1 and 2, P, P², P⁴ represent fence posts on one side of a field, on which are mounted the usual fence wires $w$. P', P³, P⁵ are fence posts on the other side of the field, similarly connected by wires. The two lines of posts are parallel to each other and the posts are an exact distance apart from each other in the row, which distance apart is determined by the width of the gang of plows or the width of the strip of ground plowed by one trip across the field.

The posts, while serving as fence posts to inclose the land, are specially planted to resist the powerful strain put upon them by the cable whose ends are successively attached to different posts to form anchorage points. For this purpose, see Fig. 3, horizontal anchor logs, sometimes called "dead men", are buried in the ground as seen at L and L'. The upper anchorage L is placed inside the vertical post P², or on the side on which the cable is attached and the lower anchorage log L' is on the outer side, so that the tendency of the cable strain to rock the top of the vertical post inward is successfully resisted by the broad bearing and direct contact of the horizontal anchor logs in the ground.

In connecting the cable to the posts, it is looped or otherwise secured around the vertical post close to the ground, so as to exert as little rocking leverage on the post as possible.

A Fig. 1 represents the cable which will preferably be made of steel wire, but which may be of hemp, or may be a chain, or a flat band. This cable has at one end a detachable and adjustable section B, and at the other end has a similar detachable and adjustable section C. These two end sections are provided with any suitable couplings. As shown in Figs. 4 and 4ª the couplings consist of a snap-hook $b$ and $c$ adapted to be coupled into the loops or bights $a\ a$ at the ends of the main cable.

E is my traction engine, which has two or more drums or take-up rollers $e$ Figs. 5 and 6 which grip the cable A and take up or pull in the same and in taking it up pull the traction engine and plows across the field. At the rear of the traction engine there is a horizontal swinging guide arm or boom D carrying two pairs of vertical guide rollers $d\ d$ between which the cable passes from the gripping devices to the outer end of the boom arm, passing to the ground again at a distance to one side of the engine and parallel to the cable in front of the engine, but offset therefrom far enough to relay the cable in the line on the new ground which it must occupy for the return trip. The reversible boom is hung to the rear of the traction engine about a vertical axis and is capable of being swung to project either upon the right or left hand side of the engine, it being necessary to shift this cable-laying boom at the end of each trip across the field. That this may be better understood, I will now describe the method of connecting and shifting the cable and operating the engine.

In Fig. 1 the engine is making its first trip across the field and the cable in front of the engine is attached to post P which is bearing the pull of the cable, and the engine is passing to the right with its gang of plows $x$, leaving a series of furrows 1 as broad as the gang of plows. The boom arm D is swung to the left of the engine and is relaying the cable from post P' in a position offset from but parallel to the cable in front of the engine. When the engine reaches the position of the dotted lines and is in the end section C of the cable, this end section C is uncoupled from the post P and also at the coupling $a\ c$ and the engine, with this section of cable C in its gripping rollers, is turned around for the return trip. The adjustable section C of the cable, which the engine now carries, is connected to the next post $P^2$ behind the engine and is also coupled to the relaid cable shown by dotted position A', and the relaying arm D, which was on the left hand side on the first trip, is swung around to the right hand side. The engine now starts back and soon passes out of the end section C of the cable which the engine has carried to this new position, and the engine then proceeds to the left as in Fig. 2, plowing a series of furrows 2 joining on to those formerly made at 1 by the previous trip. The engine now is pulling on the cable A and anchorage post P' in front and is paying out the cable behind, which it will be remembered is attached to the post $P^2$ and in a line far enough offset for the third trip. When the engine in Fig. 2 reaches the dotted position, it has passed into the adjustable end section B of the cable and this end section B is now detached from post P' and also at the coupling $b\ a$ and the engine is again turned around, the end section B which it carries being recoupled to the next post $P^3$ and to the main cable section as indicated at A, the boom arm being again swung around so that it is on the left hand side again as in Fig. 1 and the engine then proceeds to make its third trip across the field. In this way the furrows are successively laid until the entire field is plowed, only a single length of cable stretched across the field being required. As the engine requires to be turned at each end of a row it is desirable that the field should be laid off in as long furrows as practicable and these furrows may be as much as a half a mile or more in length.

In my traction engine it will be understood that while it is geared to pull on the cable so as to draw the engine and plows across the field, it is also constructed and geared in the usual way of self propelled vehicles, since when turning at the ends of the row, to reverse its connection with the cable, it must pass over and turn around under its own power as a self propelled vehicle, for which purposes it is constructed in the usual way of self propelled vehicles and which it is not necessary to describe in detail. When running under its own power, however, the plows are to be thrown out of the ground until the engine is fully reversed and connected up again for the return trip.

If a chain should be used instead of a cable then the engine will be equipped with sprocket wheels engaging therewith, and when a steel cable is used, several wraps of the same around the drums or rollers will be required to give the frictional grip as employed in hoisting engines, elevators, and the like.

By the apparatus and system of management described, I am able to make the traction engine very light and of small power and am able to make available for this purpose traction engines of the gasolene type.

By planting the posts as described I am able to make them do the double duty of sustaining the fencing wires and forming anchorage posts for the draft strain and at the same time the fence wires brace and stiffen the posts against the draft strain.

In designating the part A B C as a cable, I would have it understood that I use it as a convenient descriptive term only, meaning thereby to include any other flexible connection such as a chain or band as herein set forth. Also in using the term plowing I mean thereby to include harrowing, cultivating, reaping, mowing and other like operations in the field.

I claim—

1. A traction apparatus for field operations, comprising two series of anchorage posts spaced apart in the field with the posts on one side midway between the posts on the other side, a line of cable shiftable along the space between said series of posts and adapted to connect with said posts, and a traction engine with means for pulling on the cable in front and paying it out behind to advance the engine and its attachments across the field.

2. A traction apparatus for field operations comprising two series of posts, longitudinal fence wires for each series, underground anchorage for the posts to brace the same at right angles to the line of fence wires, a line of cable shiftable along the space between said series of posts and adapted to connect with said posts, and a traction engine with means for pulling on the cable in front and paying it out behind to advance the engine and its attachments across the field.

3. A traction apparatus for field operations, comprising two series of anchorage posts spaced apart as described, a line of cable shiftable along the space between said series of posts and adapted to connect with said posts, and a traction engine with means for pulling on the cable in front to advance the engine and it attachments across the field and having a reversible means for paying out the cable on either side in the rear for relaying it parallel to its former position at a predetermined distance therefrom.

4. A traction apparatus for field operations, comprising two series of anchorage posts spaced apart as described, a line of cable shiftable along the space between said series of posts and adapted to connect with said posts, and a traction engine with means for pulling on the cable in front to advance the engine and its attachments across the field, said engine having a boom arm with cable guides thereon, said arm being adjustable to either side of the engine.

5. A traction apparatus for field operations, comprising two series of anchorage posts spaced apart as described, a line of cable shiftable along the space between said series of posts and adapted to connect with said posts and made in three sections the two end sections being detachable and readjustable, and a traction engine with means for pulling in said sectional cable and passing on to the readjustable ends of the same.

6. A traction engine adapted to draw itself along a length of cable, said engine having a cable gripping and take-up device and a reversible cable laying arm.

SIDNEY COLEMAN McCANDLESS.

Witnesses:
　JAMES L. MURPHY,
　W. G. WOODFIN.